United States Patent
Mihic

[11] Patent Number: 6,116,823
[45] Date of Patent: Sep. 12, 2000

[54] SLOT MILLING TOOL

[75] Inventor: Wlajko Mihic, deceased, late of Gävle, Sweden, by Karin Ursula Maria Mihie, legal representative

[73] Assignee: Microna AB, Gavle, Sweden

[21] Appl. No.: 08/849,018

[22] PCT Filed: Nov. 14, 1995

[86] PCT No.: PCT/SE95/01352

§ 371 Date: Feb. 1, 1979

§ 102(e) Date: Feb. 17, 1998

[87] PCT Pub. No.: WO96/16763

PCT Pub. Date: Jun. 6, 1996

[30] Foreign Application Priority Data

Nov. 29, 1994 [SE] Sweden .................................. 9404013

[51] Int. Cl.[7] .................................................. B23B 27/16
[52] U.S. Cl. ............................. 407/40; 407/50; 407/109; 407/110; 407/53
[58] Field of Search ............................. 407/40, 110, 109, 407/42, 34, 35, 47, 50, 53, 51; 83/831, 845

[56] References Cited

U.S. PATENT DOCUMENTS

| | | |
|---|---|---|
| 383,103 | 5/1888 | Cook . |
| 2,787,300 | 4/1957 | Kopp . |
| 3,785,021 | 1/1974 | Norgren . |
| 3,887,975 | 6/1975 | Sorice et al. ............................. 83/844 |
| 4,363,576 | 12/1982 | Zweekly ................................... 407/50 |
| 4,492,140 | 1/1985 | Pano . |
| 4,580,930 | 4/1986 | Zinner . |
| 4,588,333 | 5/1986 | Gustafson . |
| 4,738,570 | 4/1988 | Wertheimer . |
| 5,035,545 | 7/1991 | Zinner ................................... 407/110 |
| 5,267,817 | 12/1993 | Englund ................................ 407/110 |
| 5,743,680 | 4/1998 | Von Haas et al. ..................... 407/109 |
| 5,799,554 | 9/1998 | Fredman et al. ...................... 82/160 |
| 5,820,309 | 10/1998 | Mihic ..................................... 407/50 |

FOREIGN PATENT DOCUMENTS

| | | |
|---|---|---|
| 0365299 A2 | of 0000 | European Pat. Off. . |
| 0588018 A2 | of 0000 | European Pat. Off. . |
| WO 93/08969A1 | of 0000 | WIPO . |

Primary Examiner—Henry W. H. Tsai
Attorney, Agent, or Firm—Ware, Fressola, Van der Sluys & Adolphson LLP

[57] ABSTRACT

This invention relates to slot milling tools and the like where a number of inserts (4) are detachably mounted at the periphery of a disc shaped carrier means (1). The seats (3) of the inserts are arranged within integral holding projections arranged and shaped relatively to the intended positions to the inserts that on operation the radial component of the cutting force biases the holding force acting against the insert so that it increases on increase of cutting force. This is achieved by arranging at the essentially radially projections (7) an obliquely located nose portion (8) engaging the insert.

4 Claims, 2 Drawing Sheets

SLOT MILLING TOOL

TECHNICAL FIELD OF THE INVENTION

This invention relates to slot milling tools, i.e. axially thin disc shaped bodies adapted to carry inserts and having peripheral seats intended to receive such inserts.

BACKGROUND OF THE INVENTION

Numerous constructions of slot milling tools are known. In one known case, the holding of the inserts is entrusted the inherent elasticity of the disc material wherein a self locking effect is achieved by displacing a portion of material adjacent the seat out of its rest position and by elastical force holds the insert in its inserted position. The force biassing the insert corresponds to the force necessary to displace the material portion so much as allowing the insert to be inserted.

On devices arranged according to the known art, there always is a risk for fatigue or diminishing of the elasticity or the spring power of the material portion displaced resulting in a reduction or loss of the intended holding force. This implies especially at high speed rotating milling discs not only a technical disadvantage but also a great risk for personal injuries in that disengaging inserts with high power like bullets can be thrown long distances.

OBJECTS OF THE INVENTION

One objects of the invention is to bring about a new construction of especially slot milling tools and other milling tools so arranged that it maintains the basic features of the holding system but gives a better holding function less inclined for fatigue.

SUMMARY OF THE INVENTION

The new invention is based on experiences from insert holders for parting off and the like wherein an insert is arranged in a recess and held there by a projection extending above the shaft portion of the insert wherein the shaft portion presents an engagement surface inclined against the direction of insertion and the projection which is elastically resilient presents an engagement portion engaging said surface. In engagement position, the engagement portion of the projection is displaced from its position of rest and holds the insert by means of its inherent elasticity which, thus, counteracts the displacement, against the guide for same.

According to the invention, a slot milling tool includes an essentially disc shaped supporting means having a number of seats along its periphery and at each seat an elastically displaceable projection. The projection is essentially radially extended having a root portion situated radially inside and peripherally off set relatively to the position of the insert and an outwardly tapering trunk portion with a peripherally laterally displaced nose portion presenting a peripherally facing engagement portion arranged to cooperate with an opposite peripherally facing pair of joining surfaces of the insert.

The shape of the projection and the shape of the seat for the insert are such that the holding power acting against the insert increases with increasing cutting force thanks to the radial component biassing the projection so that the holding power exerted by its nose will increase with increasing cutting force. The holding power will vary according to the kind of work and will increase with increasing cutting power and stress.

BRIEF DESCRIPTION OF THE DRAWINGS

The invention will be described in details in the following with references to the accompanying drawings, in which.

DETAILED DESCRIPTION OF THE PREFERRED EMBODIMENT

The milling disc 1 functioning as holder for the inserts is made of high quality steel material or the like and normally has a thickness in the range of 2–6 mm.

The disc 1 has a central shaft bore 2 with a recess for a key.

Figure 1:
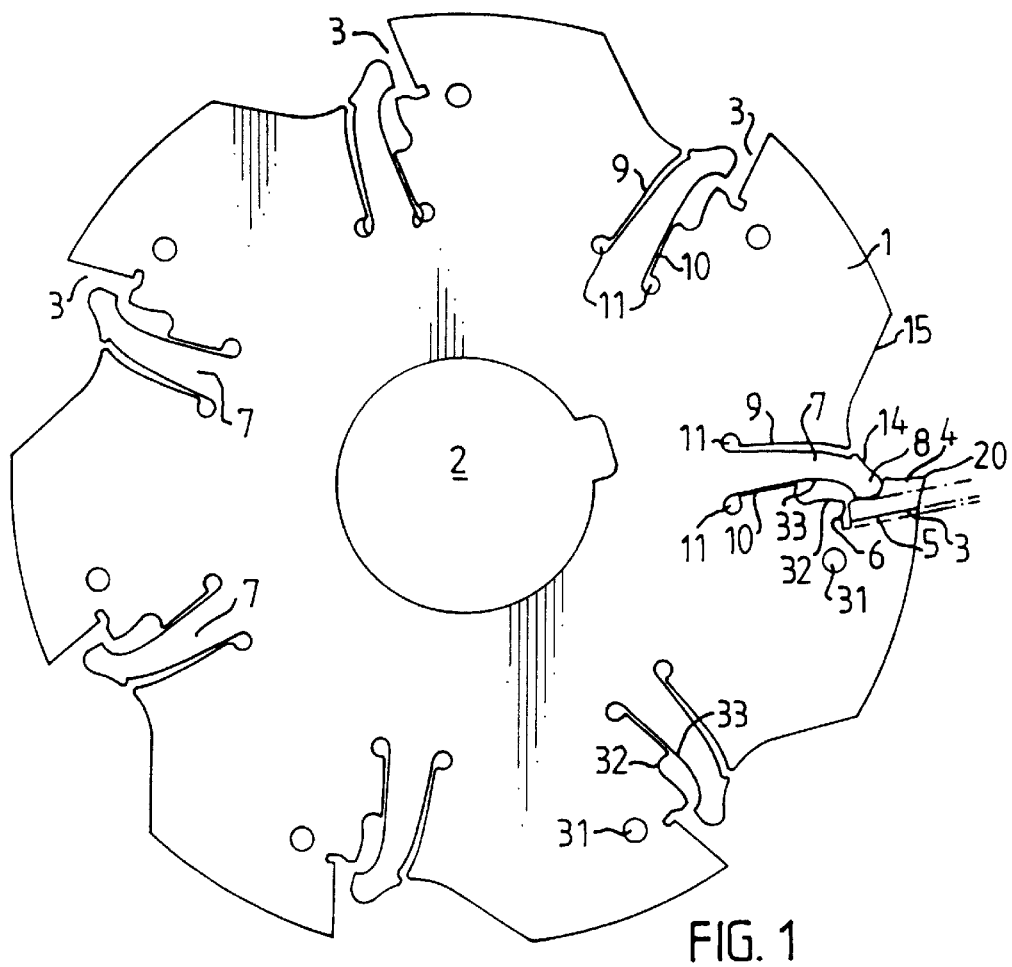
FIG. 1 is a side view of a milling disc arranged according to the invention.

Along the periphery are arranged a number of seats 3 for inserts 4, only one shown in FIG. 1 and this is arranged as follows.

The seat proper includes a V-shaped guide 5 extending from the periphery disc 1 and following a chord, which counted from the periphery diverts from the radius so that the inner end of the guide is situated—seen in the direction of rotation—beyond said radius. In other words, the elongated guide 5 extends along a chord which beginning at a point at the peripheral end of the guide 5 diverts from a radius drawn from the same point.

A projection 7 having an insert 4 engaging nose portion 8 is reached by cutting slots 9 and 10 in the disc 1. The inner ends of the slots present rounded recesses 11 intended to prevent crack formation in the material. The projection 7 has a trunk portion 12 with a decreasing width from a root portion 13 and its outer end is curved in the direction of the periphery in order to form the nose portion 8.

The nose portion 8 has a side 14 facing upwardly/outwardly and a curve joining the upper side of the insert 4 and an adjoining recess 15 at the edge of the disc 1. Hereby is achieved essentially non broken guiding surface for chips.

The side of the nose portion 8 facing in the opposite direction has two essentially flat surfaces 16 and 17 meeting each other with an engagement edge 18 and the forward surface 17 adjoins a transverse abutment surface 19.

Figure 3:
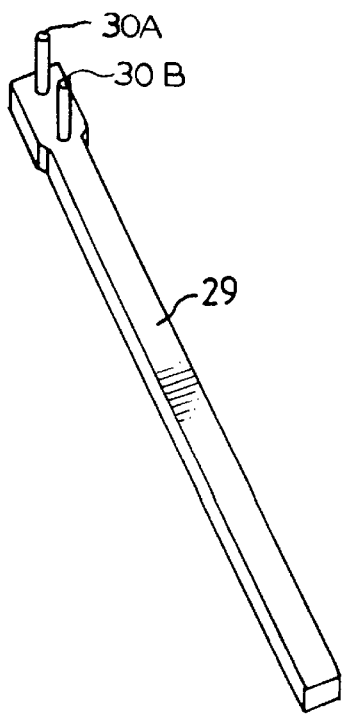
FIG. 3 is a perspective view illustrating a tool arranged for facilitating the change of inserts.
Figure 2:
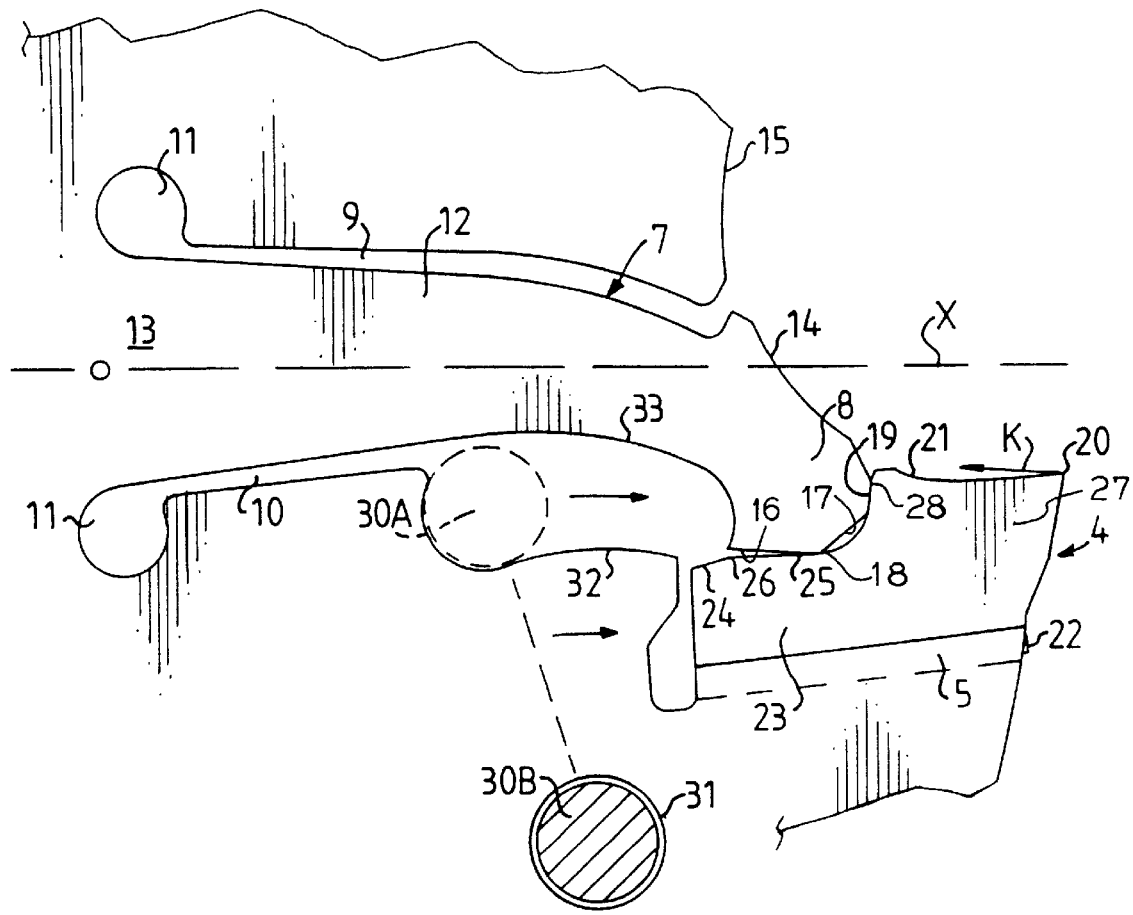
FIG. 2 is a broken out enlarged portion of the same disc.

The insert 4 which is of a per se known type has a front edge 20 and adjoining to same an upper face 21 arranged for bringing about the intended chip breaking. The underside of the insert presents a V-shaped ridge 22 adapted to cooperate with the guide 5 so that intended support and guiding is achieved. At the rear end of the insert there is a shaft 23 and the upper side of this has at the rear a surface 24, which is inclined forwardly seen in the direction of insertion and an engagement surface 25 which is oppositely inclined. The two surfaces meet each other at a ridge 26. Adjacent the connection of the shaft 23 at the head 27 of the insert 4 there is a transverse surface 28 forming an abutment. The material forming the projection 7 is normally so hard that it is impossible to remove or insert an insert without tools. For this purpose, a tool 29 is used which tool is shown in perspective view according to FIG. 3 and has two separated pins 30A and 30B. Of the pins one is intended to be inserted in a hole 31 arranged below and beyond the guide 5 whereas the other one is to be inserted in an opening formed by an extension along part of the outer side of the slot 10 restricting the projection 7 in the one direction. The opening is defined outwardly by a curved edge surface 32 and inwardly by an edge portion 33 of the projection 7.

In an initial position, the tool 29 is applied so that the one pin 30A is in an initial position illustrated a dash line circle at the inner end of the opening whereas the other pin 30B is in a hole 31. On turning the tool 29 around its fulcrum formed by the pin 30B in the hole 31, the pin 30A will slide along the curve shaped edge surface 32 which follows an arc of a circle having the hole 31 as a center and simultaneously slide against the curved edge portion 33 of the projection 7. The pin 30A will then with a wedging effect lift the projection 7 from the surface 32 and thereby lift the nose portion 8 away from the guide 5. By allowing the pin 30A to slide against the edge surface 32 simultaneously as it slides along the edge surface 33 of the projection the pin 30A will be essentially unloaded of radial stresses and only be loaded by the stress in its direction of movement resulting from the friction against the adjoining surfaces. By the described bending upwardly of the projection 7 and the removing of the nose portion 8 from the guide 5 insertion and removal of inserts 4 along the guide 5 can be done without overcoming any spring force. On insertion of an insert 4 it is slid along the guide 5 until the abutment surface 19 of the nose portion 8 engages the transverse abutment surface 28 of the insert 4. Thereupon, the tool 29 will be turned back resulting in that the abutment edge 18 of the nose portion 8 will meet the outwardly obliquely arranged engagement surface 25 in front of the ridge 26 and hold the insert in engagement against the guide 5. The relations of the dimensions are so adapted that at the nose portion 8 remains only a bending out amounting to some tenth of a millimeter which results in producing the clamping force necessary to keep the insert 4 in place. The nose portion 8 thereby will be exposed to a minimum stress fatigue. The motions on dismounting are the same as on mounting but in opposite order.

On slot milling tools according to the invention, the point of attack of the cutting forces will be situated below or after a radius along the radial length axis of the projection 7 seen in the working direction because of the location of the insert seats 3 and thereby the position of the cutting edge 20 relatively to said radial length axis X. This means that a radial force component K which via the insert 4 and the engagement surfaces 28,19 will act against the nose portion 8 and thereby the projection 7 will act along a radius below or along the longitudinal axis radius X. The force component K aims at pressing the nose portion 8 inwardly towards the center of the disc but this results—because of the peripherally bent nose portion 8—in that, with a force proportional to the force K the nose portion will be pressed in peripheral direction, i.e. against the insert 4. The force component K can be said to attempt to bend the projection 7 over and against its root portion 13. Consequently, the clamping force at the insert 4—the force pressing the insert 4 against the guide 5—will vary with the size of the cutting force/load.

If the load increases, thus, the insert 4 will be pressed harder against its seat 3. It is easily seen that this feature is of the greatest importance especially on intermittent working operations such as are frequent during milling operations.

The risk mentioned in the beginning of the description and existing at known devices, i.e. that one or more inserts because of the centrifugal force are loosened and disengage from the milling disc is completely eliminated at the arrangement according to this invention. The nose portion 8 of the projection 7 engages the engagement surface 25 which is obliquely arranged in such a way relative to the guide, 5 that the inner end—nearest the rotational center of the milling tool—is located on a greater perpendicular distance from the guide 5 than the outer end of the same surface. The cooperation between the obliquely against the possible disengagement direction localized surface 25 and the abutment edge 18 of the nose portion 8 results in a locking together due to shape or more precisely a negative wedge locking of the insert 4 in the milling disc 1. The locking achieved by the engagement of the abutment edge 18 with the obliquely arranged surface 25 is so powerful that an insert 4 under no circumstances can be disengaged from the milling disc 1 during normal milling operations.

Conventional holders for inserts of the kind utilized on slot milling and the like include numerous parts such as screws clamping arms and the like and are difficult and costly to manufacture. The milling disc or holder body according to the invention is very simple and cheap to manufacture as the shape of different parts thereof are well adapted for machining by means of spark cutting processes.

What is claimed is:

1. Slot milling tool holder for use with replaceable inserts, each replaceable insert having a guide engagement surface, a projection engagement surface and an inwardly facing step surface, the slot milling tool holder comprising:

an essentially disc shaped rotatable carrying means having a periphery with a plurality of seats for the replaceable inserts, each seat including an elongated guide which extends inwardly from the periphery of said carrying means a distance essentially corresponding to a length of the guide engagement surface of its respective replaceable insert and defines a position for its respective replaceable insert, the carrying means adjacent each seat having an integral insert engaging projection, each integral insert engaging projection includes an inner essentially radial trunk portion situated radially inside and peripherally offset relatively to the position for its respective replaceable insert defined by the guide and an outer nose portion projecting above the guide and bent in a peripheral direction and adapted to engage its respective replaceable insert inserted into its respective seat to engage the elongated guide thereof, each integral insert engaging projection is resiliently displaceable from a rest position to allow the insertion of its respective replaceable insert and radially bendable by influence of a cutting force biassing its respective replaceable insert to allow an increased holding force to be exerted against its respective replaceable insert, the nose portion is located at a predetermined distance from the guide, the nose portion has an abutment means facing the guide and arranged to engage the projection engagement surface of its respective replaceable insert, the projection nose portion also has an abutment portion facing radially outwardly for cooperating with the inwardly facing step surface of its respective replaceable insert, wherein each integral insert engaging projection has a cam shaped edge portion arranged along a portion of an opening outwardly defined by an essentially circular curve shaped convex edge surface, the carrying means defines a circular bore for each integral insert engaging projection and spaced from the edge surface and adapted to receive one of a pair of rigidly arranged pins of a tool and the other pin of the pair is arranged to be received in the portion of the opening at each integral insert engaging projection to engage the edge portion of the respective projection along the portion of the opening and, on turning of the tool around the center constituted by the pin received in the bore, the other pin is intended to be slidingly supported by the circular curve shaped convex edge surface, and slidingly engage the cam shaped edge portion of the respective integral insert engaging projection in order to bend the respective projection against its inherent elasticity thereby moving the respective projection away from the guide allowing manipulation of the respective replaceable insert.

2. A slot milling tool holder according to claim 1, wherein the projection engagement surface of each replaceable insert is obliquely arranged relatively to the elongated guide so that a negative wedge locking effect is achieved in cooperation with a transverse engagement edge of the projection.

3. Slot milling tool comprising:
  (a) an essentially disc shaped rotatable carrying means having a periphery with a plurality of seats for replaceable inserts, each seat including an elongated guide which extends inwardly from the periphery of said carrying means a distance essentially corresponding to a length of a guide engagement surface of its respective replaceable insert, the carrying means adjacent each seat having an integral projection, each integral projection includes an inner essentially radial trunk portion and an outer nose portion bent in a peripheral direction and adapted to engage its respective replaceable insert inserted into its respective seat and engaging the elongated guide thereof, each integral projection is resiliently displaceable from a rest position to allow the insertion of its respective replaceable insert and resiliently bendable in an essentially radial direction on being pressed radially inwardly under influence of increased cutting stresses acting against its respective replaceable insert, the nose portion is located at a predetermined distance from the guide, the nose portion has an abutment means facing the guide and arranged to engage the projection engagement surface of its respective replaceable insert, the projection nose portion also has an abutment portion facing radially outwardly for cooperating with an inwardly facing step surface of its respective replaceable insert, wherein each integral insert engaging projection has a cam shaped edge portion arranged along a portion of an opening outwardly defined by an essentially circular curve shaped convex edge surface, the carrying means defines a circular bore for each integral insert engaging projection and spaced from the edge surface and adapted to receive one of a pair of rigidly arranged pins of a tool and the other pin of the pair is arranged to be received in the portion of the opening at each integral insert engaging projection to engage the edge portion of the respective projection along the portion of the opening and, on turning of the tool around the center constituted by the pin received in the bore, the other pin is intended to be slidingly supported by the circular curve shaped convex edge surface, and slidingly engage the cam shaped edge portion of the respective integral insert engaging projection in order to bend the respective projection against its inherent elasticity thereby moving the respective projection away from the guide allowing manipulation of the respective replaceable insert; and
  (b) a replaceable insert in each seat of said carrying means, each replaceable insert having:
    (i) a guide engagement surface resting against the guide of its respective seat,
    (ii) a projection engagement surface with its respective projection engaged therewith, the projection engagement surface inclined so that an inner end thereof nearest a rotational center of said carrying means is located a greater perpendicular distance from the guide engagement surface than a perpendicular distance of an outer end of the projection engagement surface, farthest from the rotational center of said carrying meant from the guide engagement surface, and
    (iii) an inwardly facing step surface engaged with the radially outwardly facing abutment portion of its respective projection nose portion thereby defining an inward most position of the replaceable insert relative to its seat.

4. A slot milling tool according to claim 3, wherein the projection engagement surface of each replaceable insert is obliquely arranged relatively to the elongated guide so that a negative wedge locking effect is achieved in cooperation with a transverse engagement edge of the projection.

* * * * *

UNITED STATES PATENT AND TRADEMARK OFFICE
CERTIFICATE OF CORRECTION

PATENT NO. : 6,116,823
DATED : September 12, 2000
INVENTOR(S) : Wlajko Mihic

It is certified that error appears in the above-identified patent and that said Letters Patent is hereby corrected as shown below:

1. At IND [75], "Karin Ursula Maria Mihie" should be --Karin Ursula Maria Mihic--.

2. At IND [73], "Microna AB" should be --Mircona AB--.

3. Under FOREIGN PATENT DOCUMENTS, insert the document dates as follows:

--EP    0365299 A2    04/25/1990
    EP     0588018 A2    03/23/1994
    WO    93/08969 A1    05/13/1993--.

4. Column 1,
    Line 27, "objects" should be --object--.

5. Column 3,
    Line 64, after "guide", "," should be deleted.

6. Column 6,
    Line 29, "meant" should be --means--.

Signed and Sealed this

Nineteenth Day of June, 2001

Attest:

NICHOLAS P. GODICI
Attesting Officer    Acting Director of the United States Patent and Trademark Office